US012666458B2

(12) United States Patent　(10) Patent No.:　US 12,666,458 B2
Kwok et al.　(45) Date of Patent:　Jun. 23, 2026

(54) EXTENDED REALITY DEVICE DIFFERENTIATION

(71) Applicant: T-MOBILE INNOVATIONS LLC, Overland Park, KS (US)

(72) Inventors: Ming Shan Kwok, Seattle, WA (US); Wafik Abdelshahid, Kenmore, WA (US); Yasmin Karimli, Kirkland, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 677 days.

(21) Appl. No.: 17/978,861

(22) Filed: Nov. 1, 2022

(65) Prior Publication Data

US 2024/0147517 A1　May 2, 2024

(51) Int. Cl.
　*H04W 72/56*　(2023.01)
　*G06T 19/00*　(2011.01)
　*H04W 72/20*　(2023.01)

(52) U.S. Cl.
　CPC ........... *H04W 72/56* (2023.01); *G06T 19/006* (2013.01); *H04W 72/20* (2023.01)

(58) Field of Classification Search
　CPC ..... H04W 72/56; H04W 72/20; H04W 72/51; G06T 19/006
　See application file for complete search history.

(56) References Cited

U.S. PATENT DOCUMENTS

| | | | | |
|---|---|---|---|---|
| 9,888,385 | B1 * | 2/2018 | Oh | H04W 4/70 |
| 2021/0377866 | A1 * | 12/2021 | Kim | H04W 52/0251 |
| 2022/0248176 | A1 * | 8/2022 | Hwang | H04W 4/20 |
| 2022/0386165 | A1 * | 12/2022 | Liu | H04W 76/14 |
| 2023/0354405 | A1 * | 11/2023 | Cao | H04W 72/12 |
| 2024/0008071 | A1 * | 1/2024 | Xu | H04W 72/21 |
| 2024/0020928 | A1 * | 1/2024 | Cheng | B60K 35/28 |
| 2024/0023157 | A1 * | 1/2024 | Maamari | H04W 72/1268 |
| 2024/0049134 | A1 * | 2/2024 | Shrivastava | H04W 76/28 |
| 2025/0048187 | A1 * | 2/2025 | Fujishiro | H04W 28/22 |
| 2025/0106291 | A1 * | 3/2025 | Luo | H04L 12/1407 |
| 2025/0203496 | A1 * | 6/2025 | Aono | H04W 76/50 |

* cited by examiner

*Primary Examiner* — Ricky Q Ngo
*Assistant Examiner* — Kabir U Jahangir
(74) *Attorney, Agent, or Firm* — SHOOK, HARDY & BACON L.L.P.

(57)　ABSTRACT

Aspects provided herein to provide methods, systems, and a non-transitory computer storage media storing computer-useable instructions to differentiate extended reality (XR) devices in a wireless network. The method begins a base station receiving an uplink message containing an XR identifier from an XR device. The base station determines a priority for the XR device using the XR identifier. Based on the priority transmissions are scheduled to the XR device.

20 Claims, 6 Drawing Sheets

500

502 — RECEIVING AN UPLINK MESSAGE FROM AT LEAST ONE XR DEVICE, THE UPLINK MESSAGE CONTAINING AN XR IDENTIFIER

504 — DETERMINING A PRIORITY FOR THE AT LEAST ONE XR DEVICE BASED ON THE XR IDENTIFIER

506 — SCHEDULING TRANSMISSIONS TO THE XR DEVICE BASED ON THE PRIORITY

500

502 — RECEIVING AN UPLINK MESSAGE FROM AT LEAST ONE XR DEVICE, THE UPLINK MESSAGE CONTAINING AN XR IDENTIFIER

504 — DETERMINING A PRIORITY FOR THE AT LEAST ONE XR DEVICE BASED ON THE XR IDENTIFIER

506 — SCHEDULING TRANSMISSIONS TO THE XR DEVICE BASED ON THE PRIORITY

EXTENDED REALITY DEVICE DIFFERENTIATION

BACKGROUND

Extended reality (XR) devices are becoming increasingly common. XR devices can include cameras, microphones, and sensors that are used to incorporate information about a user's environment into the XR devices. User environment information can be used in gaming applications, for example, to prevent users from crashing into furniture during a game. XR devices can also be used as mobile computing platforms and need to connect to a network, such as a 5G or 6G network. When connected to the network XR devices need low latency in order to operate successfully and efficiently to ensure both operation and user satisfaction. Presently, providing a guaranteed bit rate (GBR) is expensive and other mechanisms such as a quality of service identifier (QCI) do not differentiate between types of data services. As one example, internet browsing, receives the same QCI or quality of service (QOS) as extremely low latency services such as augmented reality (AR), virtual reality (VR) or gaming summary.

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for extended reality (XR) device differentiation are provided. The method begins with receiving an uplink message from at least one extended reality (XR) device. The uplink message is received at a base station and contains at least one XR identifier. The base station uses the XR identifier to determine a priority for the at least one XR device. Once the base station has determined a priority for the at least one XR device transmissions are scheduled to the at least one XR device based on the priority.

In a further embodiment, a system for data XR device differentiation is provided. The system includes a base station with one or more antennas for receiving uplink messages from at least one XR device. The antennas are also used to transmit data to the at least one XR device. In addition, the base station includes a processor that is configured to receive at least one uplink message from at least one XR device. The at least one uplink message contains at least one XR identifier. Using the XR identifier, the processor determines at least one priority for the at least one XR device based on the at least one XR identifier. A scheduler then schedules data transmissions to the at least one XR device based on the at least one priority.

An additional embodiment provides a non-transitory computer storage media storing computer-useable instructions that, when executed by one or more processors cause the processors to transmit an uplink message from an extended reality device. The uplink message from the XR device includes an XR identifier. The XR identifier includes priority information that requests a priority for the at least one XR device. The XR device then receives scheduled transmissions based on the priority.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
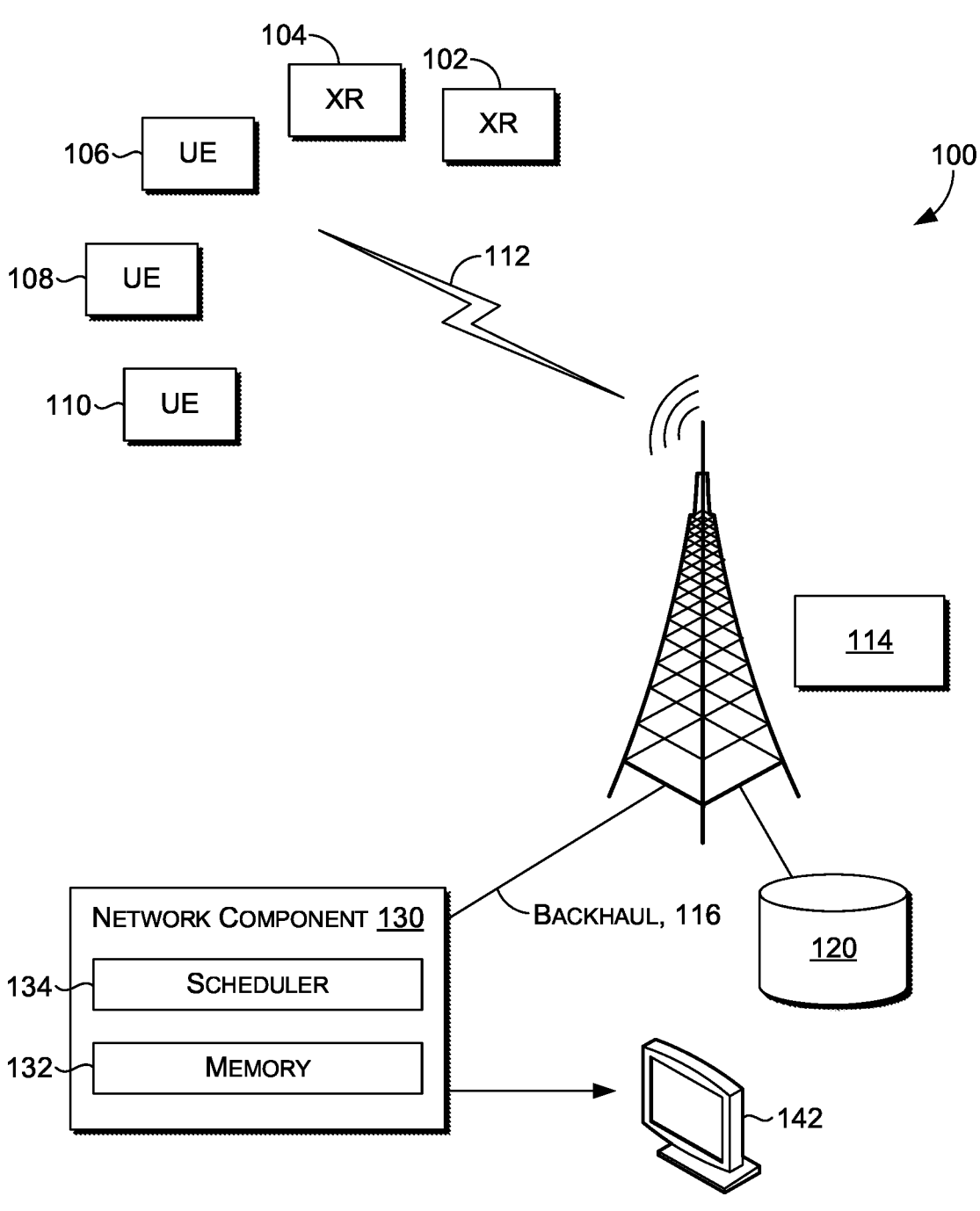
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
ML Machine Learning
PC Personal Computer PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Signal Received Power
RSRQ Reference Signal Received Quality
RSSI Received Signal Strength Indicator
SINR Signal-to-Interference-Plus-Noise Ratio
SNR Signal-to-Noise Ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable
    with UE)

Further, various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers) to provide network coverage. The base stations are employed to broadcast and transmit transmissions to user devices of the telecommunications network. An base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 600 described herein with respect to FIG. 6.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In aspects, a UE provides UE data including location and channel quality information to the wireless communication network via the base station. Location information may be based on a current or last known position utilizing GPS or other satellite location services, terrestrial triangulation, an base station's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the base station or at the individual antenna array of the base station. In other aspects, the processing of said information may be done remotely.

A service state of the UEs may include, for example, an in-service state when a UE is in-network (i.e., using services of a primary provider to which the UE is subscribed to, otherwise referred to as a home network carrier), or when the UE is roaming (i.e., using services of a secondary provider providing coverage to the particular geographic location of the UE that has agreements in place with the primary provider of the UE). The service state of the UE may also include, for example, an emergency only state when the UE is out-of-network and there are no agreements in place between the primary provider of the UE and the secondary provider providing coverage to the current geographic location of the UE. Finally, the service state of the UE may also include, for example, an out of service state when there are no service providers at the particular geographic location of the UE.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

Aspects of the present disclosure provide a way to distinguish the XR device from other devices on the network with different latency needs. An identifier is sent to the base station, which can be a gNodeB, and is used to implement a separate network queue for the XR device and also to inform the network of the presence of the XR device. A scheduler of the base station uses the identifier to prioritize data transmissions for the XR device.

In accordance with a first aspect of the present disclosure a method for extended reality (XR) device differentiation is provided. The method begins when a base station receives an uplink message from at least one XR device. The uplink message from the XR device contains at least one XR identifier. The XR identifier is used by the base station to determine a priority for the at least one XR device. Once the priority for the at least one XR device has been determined the base station schedules transmissions to the at least one XR device based on the priority. The priority ensures that the XR device receives low latency data transmissions.

A second aspect of the present disclosure provides a system for extended reality (XR) device differentiation. The system includes a base station that has one or more antennas used for receiving uplink messages and transmitting downlink messages. The messages may be from at least one XR device. The at least one XR device transmits an uplink message that contains an XR identifier. The XR identifier is used by the base station to determine the priority of the data to be transmitted to the at least one XR device. A scheduler then schedules transmissions to the at least one XR device based on the at least one priority.

Another aspect of the present disclosure is directed to a non-transitory computer storage media storing computer-useable instructions that, when used by one or more processors, cause the processors to transmit an uplink message from at least one XR device. The uplink message sent by the at least one XR device contains an XR identifier unique to the XR device. The XR identifier is used to request a priority for the at least one XR device and to identify the device to the base station as an XR device. The XR device then receives scheduled transmissions from the base station based on the priority.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes extended reality (XR) devices 102 and 104, user equipment (UE) devices 106, 108, and 110, base station 114 (which may be a cell site or the like), and one or more communication channels 112. The communication channels 112 can communicate over frequency bands assigned to the carrier. In network environment 100, XR devices may take on multiple forms, such as cameras, microphones, sensors, googles, and glasses, to name a few, and UE devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device (600) that communicates via wireless communications with the base station 114 in order to interact with a public or private network.

Figure 6:
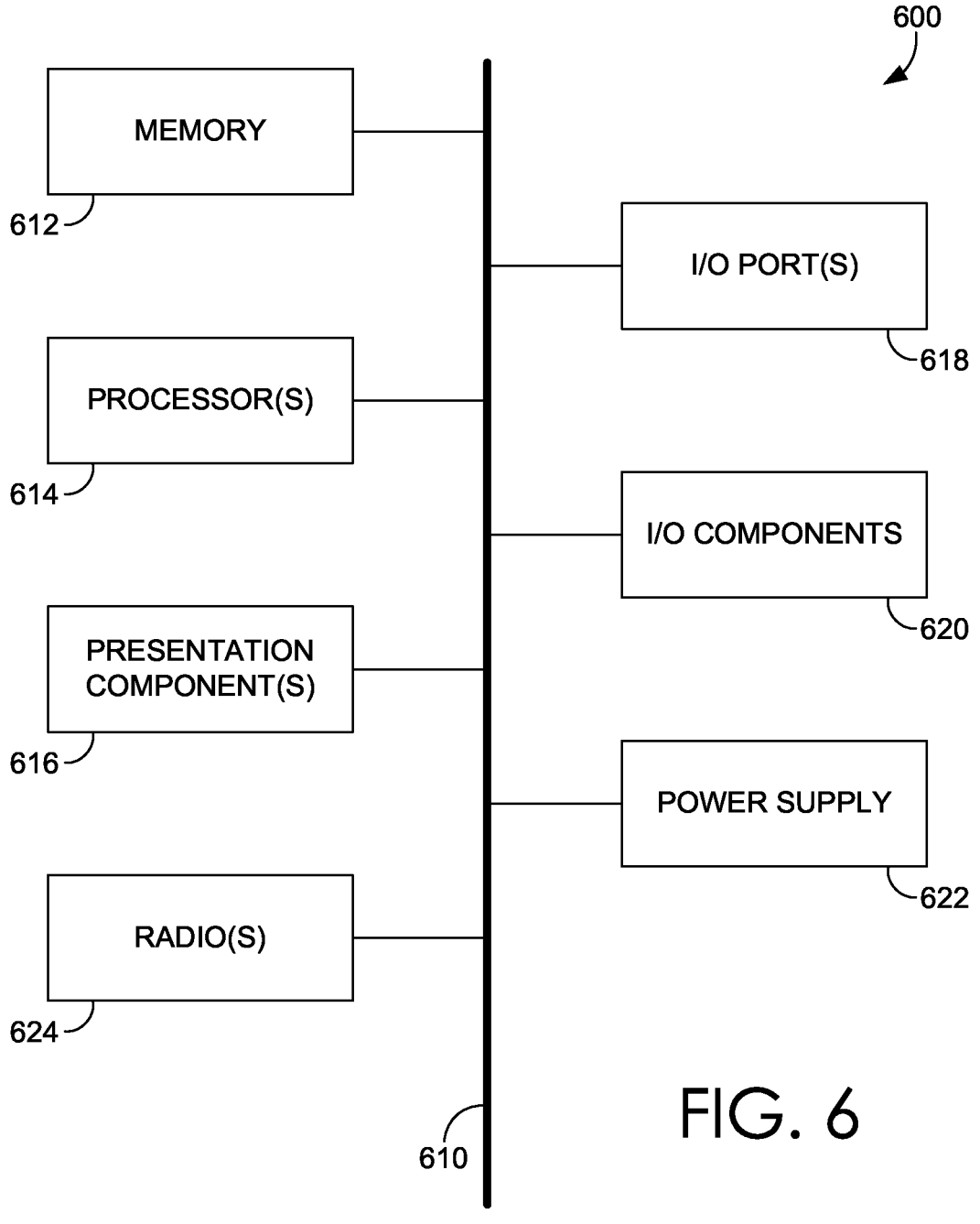
FIG. 6 depicts an exemplary computing device suitable for use in implementations of the present disclosure, in accordance with aspects herein.

In some aspects, each of the XRs 102 and 104 and UEs 106, 108, and 110 may correspond to computing device 600 in FIG. 6. Thus, an XR device or a UE can include, for example, a display(s), a power source(s) (e.g., a battery), a data store(s), a speaker(s), memory, a buffer(s), a radio(s) and the like. In some implementations, for example, an XR devices such as 102 and 104 as well as the UEs 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, XR devices 102 and 104 as well as UEs 106, 108, and 110 in network environment 100 can optionally utilize one or more communication channels 112 to communicate with other computing devices (e.g., a mobile device(s), a server(s), a personal computer(s), etc.) through base station 114. Base station 114 may be a gNodeB in a 5G or 6G network.

The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, and the like) to extended reality devices such as XR devices 102 and 104 and user devices, such as UEs 106, 108, and 110. For example, the one or more communication channels may provide voice, SMS, and/or data services to XRs 102 and 104 as well as to UEs 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), or a 5G network or a 6G network.

In some implementations, base station 114 is configured to communicate with a XR device such as 102 and 104 as well as with a UE, such as UEs 106, 108, and 110, that are located within the geographic area, or cell, covered by radio antennas of base station 114. Base station 114 may include one or more base stations, base transmitter stations, radios, antennas, antenna arrays, power amplifiers, transmitters/receivers, digital signal processors, control electronics, GPS equipment, and the like. In particular, base station 114 may selectively communicate with the user devices using dynamic beamforming.

As shown, base station 114 is in communication with a network component 130 and at least a network database 120 via a backhaul channel 116. As the XR devices 102 and 104, and UEs 106, 108, and 110 collect individual status data, the status data can be automatically communicated by each of the XR devices 102 and 104 and the UEs 106, 108, and 110 to the base station 114. Base station 114 may store the data communicated by the XR devices 102 and 104, and the data communicated by the UEs 106, 108, and 110 at a network database 120. Alternatively, the base station 114 may automatically retrieve the status data from the XR devices 102 and 104, and the UEs 106, 108, and 110, and similarly store the data in the network database 120. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the base station 114 every 10 minutes and the data stored at the network database 120 may be kept current for 30 days, which means that status data that is older than 30 days would be replaced by newer status data at 10 minute intervals. As described above, the status data collected by the XR devices 102 and 104, and the UEs 106, 108, and 110 can include, for example, service state status, the respective UE's current geographic location, a current time, a strength of the wireless signal, available networks, and the like.

The network component 130 comprises a memory 132 and a scheduler 134. All determinations, calculations, and data further generated by the scheduler 134 may be stored at the memory 132 and also at the data store 140. Although the network component 130 is shown as a single component comprising the memory 132 and the scheduler 134, it is also contemplated that each of the memory 132 and the scheduler 134 may reside at different locations, be its own separate entity, and the like, within the home network carrier system.

The network component 130 is configured to retrieve signal information, XR device information, UE device information, latency information, including quality of service (QOS) information, and metrics from the base station 114 or one of the XR devices 102 and 104, and UE devices 106, 108, and 110. XR device information can include an XR device identifier, QoS/QoS class identifier (QCI) information, and latency requirements. The QCI is a pointer to a set of QoS characteristics such as priority level, packet delay or packet error rate, or similar characteristics. XR and UE device information can include a device identifier and data usage information. The scheduler 134 can observe and track data usage and latency requirements for both XR devices 102 and 104 as well as UEs 106, 108, and 110. The scheduler 134 can be located in a central office or other centralized location for a virtualized radio access network. For a distributed radio access network, the scheduler 134 can be located at the base station 114. The base station 114 may be a gNodeB that interfaces with the scheduler 134. The scheduler 134 determines what data services are prioritized for delivery to the XR devices 102 and 104 as well as to the UEs 106, 108, and 110.

Figure 2:
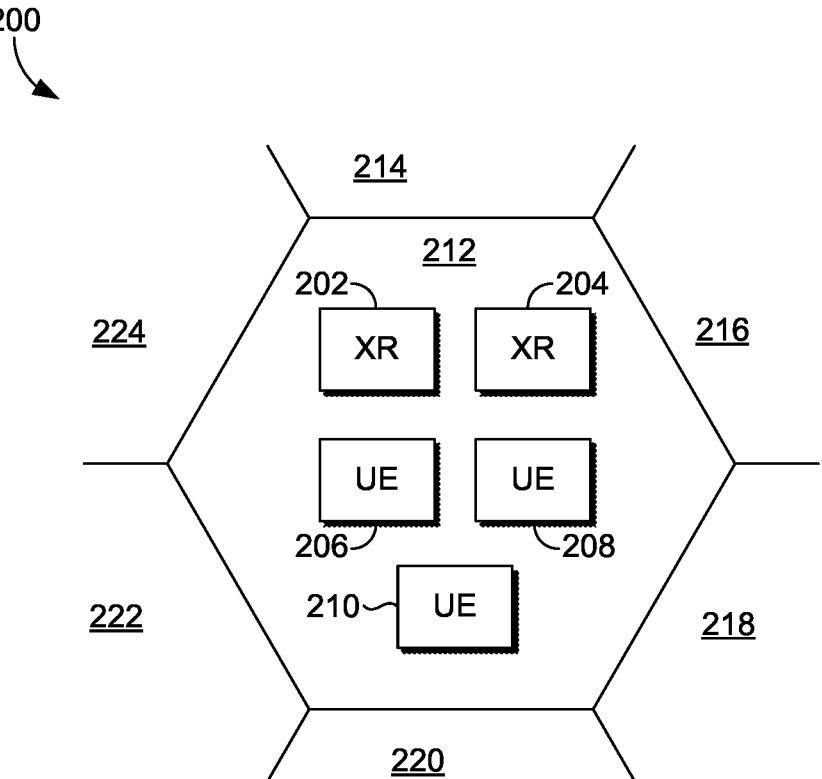
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cells 212, 214, 216, 218, 220, 222, 224, each including base station or base station 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of XRs and UEs may be located within each geographic area collecting XR and UE data within the geographic area at a given time. For example, as shown in FIG. 2, XR devices 202 and 204, and UEs 206, 208, and 210, may be located within geographic area 200 collecting XR and UE data that is useable by network component 130, in accordance with aspects herein. XR devices 202 and 204, and UEs 206, 208, and 210 can move within the cell currently occupying, such as cell 212 and can move to other cells such as adjoining cells 214, 216, 218, 220, 222 and 224.

Figure 3:
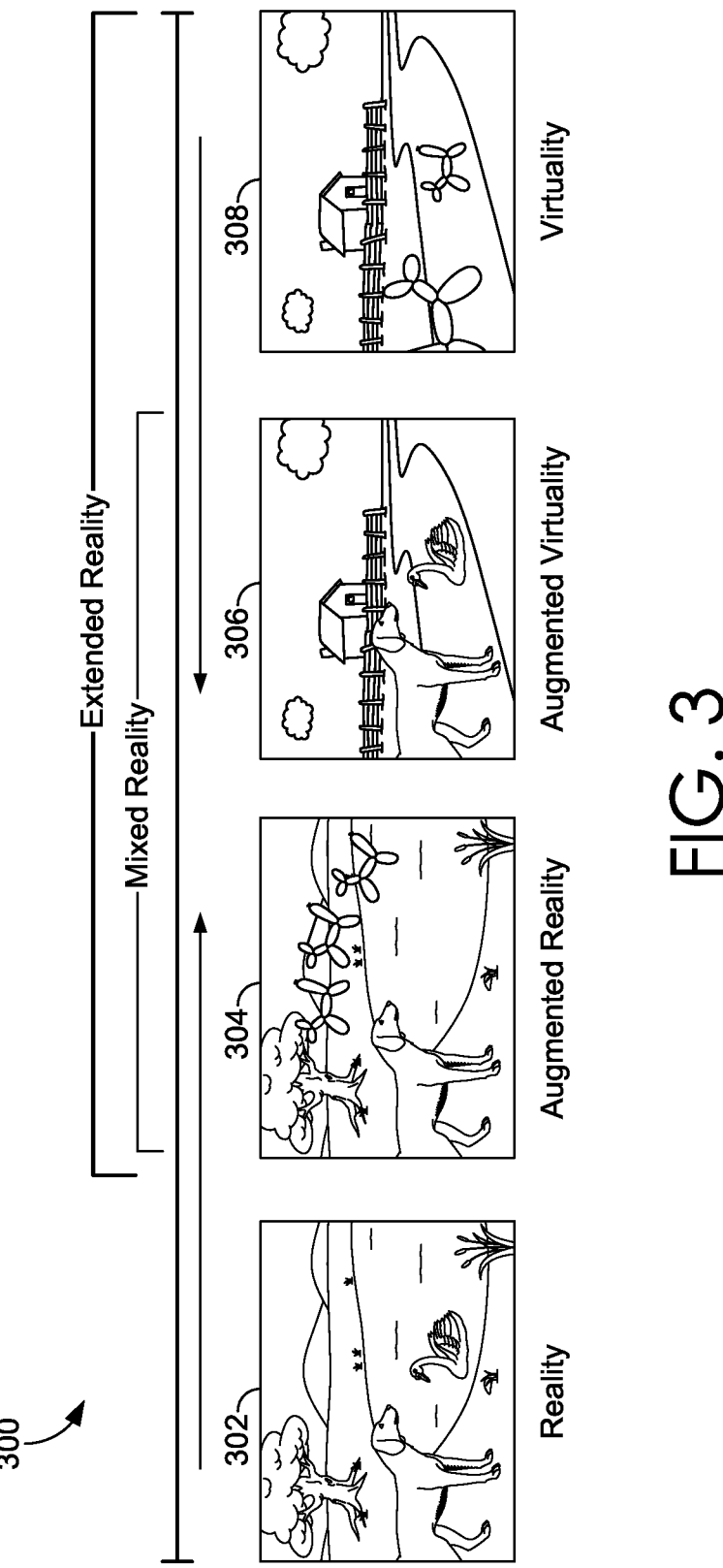
FIG. 3 depicts a range of extended reality (XR) scenes suitable for use in implementations of the present disclosure, in accordance with aspects herein.

FIG. 3 depicts a range of extended reality (XR) scenes suitable for use in implementations of the present disclosure, in accordance with aspects herein. Extended reality is an umbrella term that includes augmented reality, virtual reality, and mixed reality. XR can cover depictions that are completely real and range to completely computer-generated images. The universe of realities 300, includes reality 302, augmented reality 304, augmented virtuality 306, and virtuality 308. Reality 302 is what we see around us every day and in video depictions. Augmented reality 304 is a real-world environment with objects that are enhanced by computer-generated perceptual information. Some objects in augmented reality 304 may be entirely computer-generated yet appear within a real-world environment. Augmented virtuality 306 is a virtual environment that is enhanced with added real world elements. In contrast to augmented reality 304 where the base environment is a real world environment, the base environment in augmented virtuality is a virtual environment. Virtuality 308 is an entirely virtual environment. A XR device user may interact with any type of environment illustrated in FIG. 3.

Figure 4:
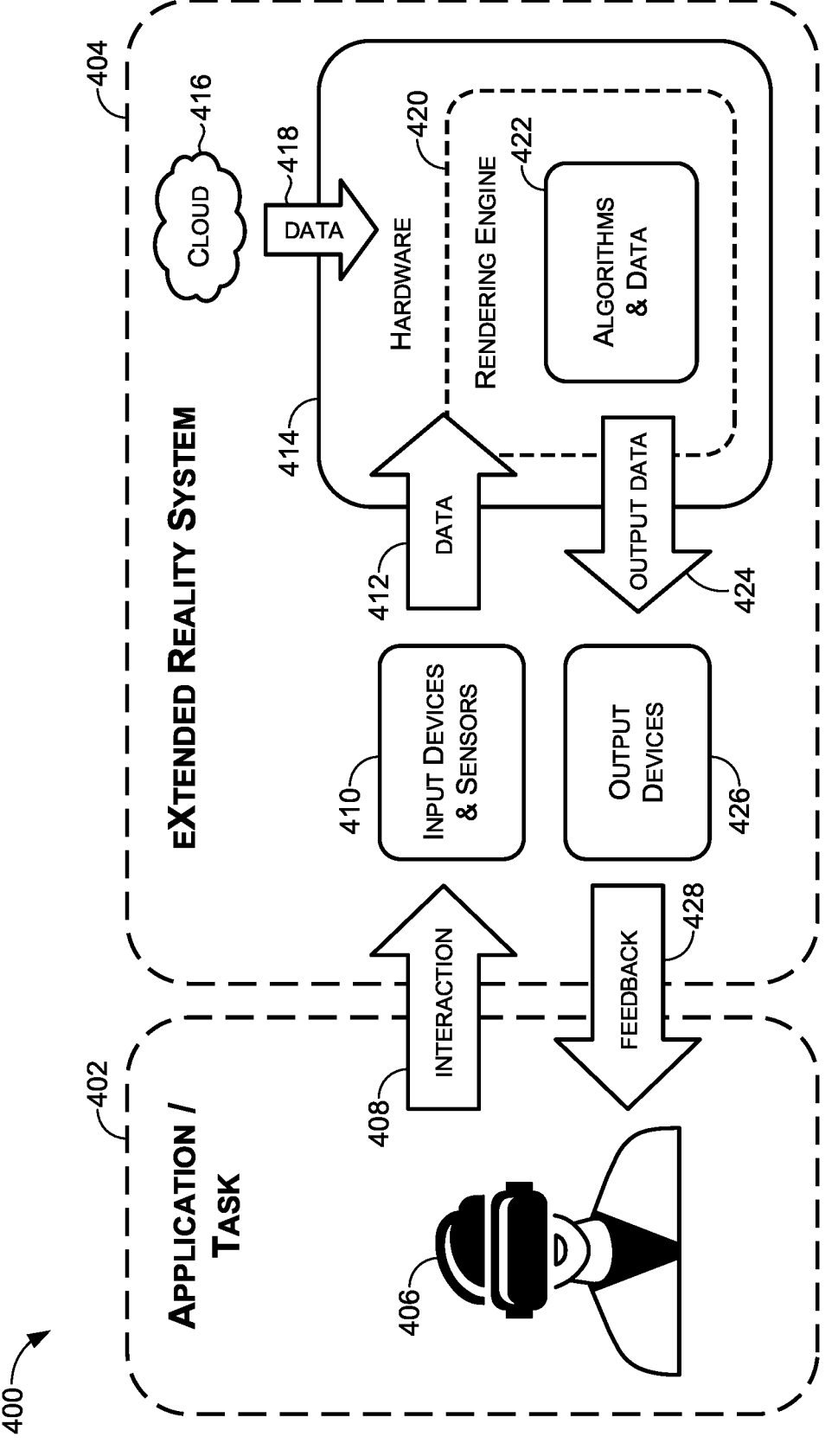
FIG. 4 depicts an extended reality (XR) system in which implementations of the present disclosure may be employed, in accordance with aspects herein.

FIG. 4 depicts an extended reality (XR) system, in which implementations of the present disclosure may be employed, in accordance with aspects herein. An extended reality ecosystem 400 includes an application or task 402 that interfaces with an extended reality system 404. The application or task 402 includes a user wearing or interacting with an XR device 406. The XR device 406 sends an interaction 408 to the XR system 404. The interaction 408 may be data, a gesture, a selection, or other indication of the user's action consistent with the inputs accepted by the XR device 406. The interaction 408 is sent to the input devices and sensors 410 within the XR system 404.

The input devices and sensors 410 send the data 412 to the hardware 414. The data 412 may be commands, data, voice, or other action consistent with the XR device 406 used by the user. Hardware 414 can also receive cloud data 418 from a cloud 416. The cloud data 418 can be additional data or information needed to render a scene or other element in the XR system 404. The cloud data 418 and the data 412 from the input devices and sensors 410 are input to the rendering engine 420. Rendering engine 420 generates a scene or other XR device compatible output based on the data 412, cloud data 418, and the operations performed on the data 412 and cloud data 418 by the algorithms and data module 422. The algorithms and data module 422 generates output data 424 that is provided to the output devices 426. The output devices 426 provide feedback 428 to the XR device 406. The feedback 428 may be visual, as in a change or adjustment of a scene, an addition, such as an added character, or may be a text, or other feedback to the user of XR device 406. Other feedback can also include haptic feedback.

XR devices use low latency services, such as guaranteed bit rate (GBR). GBR is the bit rate that the bearer is expected to provide. In a 5G network dedicated bearers carry traffic for flows that have been identified to require a specific packet forwarding treatment. Dedicated bearers can be either GBR or non-guaranteed bit rate (non-GBR). A GBR bearer has a guaranteed bit rate and a maximum bit rate (MBR) while more than one non-GBR bearer belonging to the same XR or UE shares an aggregate maximum bit rate (AMBR). Non-GBR bearers can suffer packet loss when congestion occurs while GBR bearers do not suffer such losses. A drawback to GBR for XR devices is the expense.

Problems, including packet loss, can occur when a low latency device, such as an XR device does not receive the necessary low latency bearer. QCI and QoS do not differentiate between types of data services. As a result, internet browsing can receive the same QCI or QoS as a low latency device, such as an XR device. The XR device also has no knowledge of the latency available from the radio network.

The XR device cannot obtain the latency available from the network. The information is not available on the current 5G protocol stack including the physical layer (PHY) layer, the medium access control (MAC) layer. The port control protocol (PCP) also does not provide radio network latency information. These challenges arise when a device requests a quality of service for an application or network flow that is not part of the mobile network Evolved Packet Core (EPC). The network needs to distinguish between XR devices and non-XR devices, both of which may be using Enhanced Mobile Broadband (EMBB). EMBB is a service category in a 5G network that provides a minimum level for data transfer rates. In EMBB the bit rate is not guaranteed and real time data transfer is not provided.

Aspects discussed herein provide for giving a base station knowledge of the XR devices. This knowledge of the XR device can be provided in every frame, both uplink and downlink. A bit or header field can be added in the uplink from the XR device and is used by the base station to identify the low latency requirements of the XR device. On the downlink, the scheduler of the base station uses the bit or header field to prioritize data flows to the XR device. The base station can implement a separate network queue for the core and inform the core of the low latency requirements. The 5G core establishes secure and reliable network connectivity and provides access to the services available while handling a wide variety of essential functions, including connectivity and mobility management, authentication and authorization, subscriber data management and policy management, among others. 5G core network functions can be software-based and provided as cloud services.

The bit or header field can be incorporated into the connection identifier of the XR device or the cell radio network temporary identifier (C-RNTI). The C-RNTI is used to identify a particular device, such as a UE or XR device. The C-RNTI is assigned by the base station, which assigns different values to the UEs and XR devices. The C-RNTI also identifies the radio resource connection (RRC) and is also used for scheduling. RRC is a signaling protocol that is used between a 5G network and an XR device or a UE. Including the bit or header field in the C-RNTI differentiates the XR devices from UEs that may be using the same base station.

The base station uses the C-RNTI to allocate uplink grants, downlink assignments, and physical downlink control channel (PDCCH) orders, among others. The XR identifier can be included in the PDCCH channel for downlink transmission or can be included in the physical uplink control channel (PUCCH). The base station uses the C-RNTI to differentiate uplink transmissions of a UE or XR device from other similar devices. Incorporating the XR identifier, which can be a bit or header field, in the 16 bits of the C-RNTI also ensures that the XR device is differentiated during handovers.

During handover from one base station to another base station the C-RNTI is provided by the first base station to the second base station. The base station transfers the XR context from the first base station to the second base station. This enables buffering of user data until the connection is established on the second base station. The first base station can include information on the context and send it to the second base station. Contextual information can include information that the incoming device is an XR device with low latency needs and high priority over other traffic.

The connection identifier of the XR device can also be provided over the physical layer during signaling, either in the PDCCH or the PUCCH. The base station examines the data arriving for the connection in question, here, the XR device connection, and schedules data for that connection ahead of other non-XR device downlink transmissions. The base station knows the arriving data is high priority XR traffic. This ensures that the XR device receives data in a low latency connection.

Figure 5:
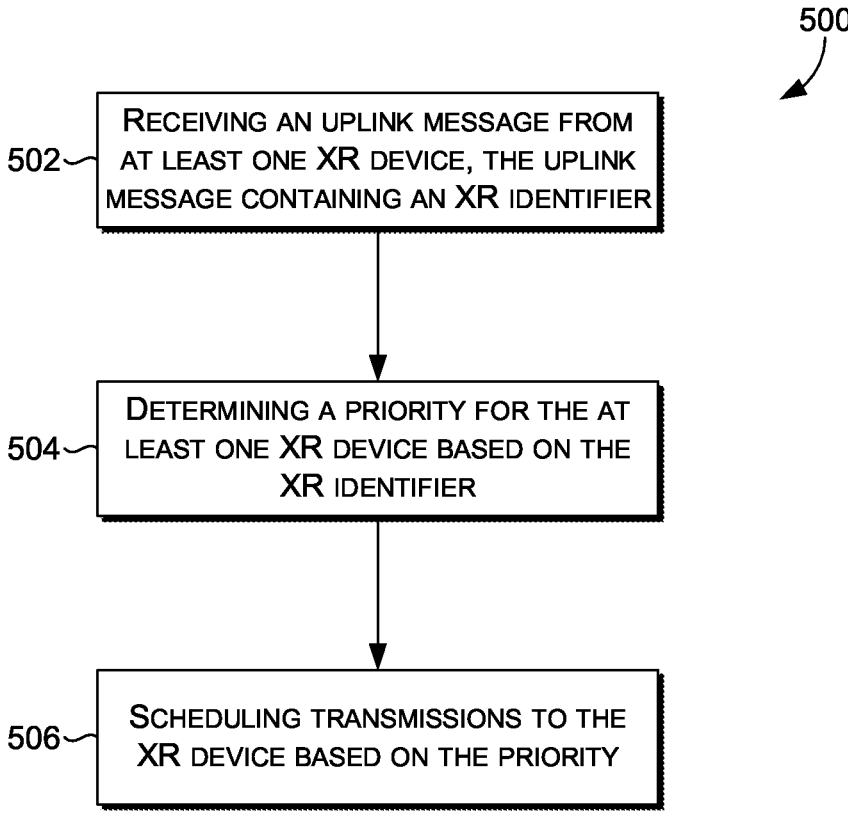
FIG. 5 is a flow diagram of an exemplary method for extended reality (XR) device differentiation, in which aspects of the present disclosure may be employed, in accordance with aspects herein.

FIG. 5 is a flow diagram of an exemplary method for extended reality (XR) device differentiation, in which aspects of the present disclosure may be employed, in accordance with aspects herein. The method 500 begins in step 502 with receiving an uplink message from at least one XR device. The XR device sends the uplink message to a base station to establish connectivity with the base station. The uplink message contains an XR identifier. The XR identifier can be included as a bit or header field and may also be incorporated into the connection identifier used in the RRC. The XR identifier may also be sent of the PUCCH or the PDCCH.

When the base station receives the uplink message containing the XR identifier the base station proceeds with determining a priority for the at least one XR device based on the XR identifier in step 504. The XR device can be assigned low latency flows and may be assigned a dedicated frequency resource. The base station then, in step 506, schedules transmissions to the XR device based on the priority.

FIG. 6 depicts an exemplary computing device suitable for use in implementations of the present disclosure, in accordance with aspects herein. With continued reference to FIG. 6, computing device 600 includes bus 602 that directly or indirectly couples the following devices: memory 604, one or more processors 606, one or more presentation components 608, input/output (I/O) ports 612, I/O components 610, radio 616, transmitter 618, and power supply 614. Bus 602 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 610. Also, processors, such as one or more processors 606, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 604 includes computer-storage media in the form of volatile and/or nonvolatile memory. Memory 604 may be removable, nonremovable, or a combination thereof. Exemplary memory includes solid-state memory, hard drives, optical-disc drives, etc. Computing device 600 includes one or more processors 606 that read data from various entities such as bus 602, memory 604 or I/O components 610. One or more presentation components 608 present data indications to a person or other device, including the goggles of an XR device. Exemplary one or more presentation components 608 include a display device, speaker, printing component, vibrating component, etc. I/O ports 612 allow computing device 600 to be logically coupled to other devices including I/O components 610, some of which may be built into computing device 600. Illustrative I/O components 610 include a microphone, joystick, game pad, satellite dish, scanner, printer, wireless device, etc.

The radio 616 represents one or more radios that facilitate communication with a wireless telecommunications network. While a single radio 616 is shown in FIG. 6, it is contemplated that there may be more than one radio 616 coupled to the bus 602. In aspects, the radio 616 utilizes a transmitter 618 to communicate with the wireless telecommunications network. It is expressly conceived that a computing device with more than one radio 616 could facilitate communication with the wireless telecommunications network via both the first transmitter 618 and an additional transmitters (e.g. a second transmitter). Illustrative wireless telecommunications technologies include CDMA, GPRS, TDMA, GSM, and the like. The radio 616 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 616 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for differentiating a device in a wireless network, comprising:

receiving an uplink message from at least one extended reality (XR) device, the uplink message containing at least one device-level XR identifier unique to the at least one XR device, wherein the at least one device-level XR identifier is incorporated into a cell radio network temporary identifier (C-RNTI) to differentiate the at least one XR device from non-XR devices during scheduling;

determining a priority for the at least one XR device using the at least one device-level XR identifier unique to the at least one XR device; and scheduling transmissions to the at least one XR device based on the priority.

2. The method of claim 1, wherein the XR identifier is provided as a bit in the uplink message.

3. The method of claim 1, wherein the XR identifier is provided in a header in the uplink message.

4. The method of claim 1, wherein the priority for the at least one XR device provides low latency.

5. The method of claim 1, wherein the priority for the at least one XR device implements a separate queue for the core.

6. The method of claim 1, wherein the XR identifier is incorporated into a connection identifier of the at least one XR device.

7. The method of claim 6, wherein the connection identifier is a cell radio network temporary identifier (C-RNTI).

8. The method of claim 1, further comprising transferring at least one XR context from a first base station to a second base station, wherein the XR context includes at least one of priority information and low latency.

9. The method of claim 1, wherein the uplink message comprises an XR identifier and at least one of: a quality of service (QOS) identifier, a quality of service identifier information (QCI), and a latency requirement.

10. The method of claim 1 wherein the XR identifier is transmitted during signaling in the physical uplink control channel (PUCCH).

11. The method of claim 1, wherein scheduling transmissions to the at least one XR device use a dedicated XR channel section.

12. The method of claim 1, wherein scheduling transmissions to the at least one XR device use a dedicated frequency resource.

13. The method of claim 12, wherein the dedicated frequency resource is scheduled based on orthogonal frequency division multiple access (OFDMA) uplink and downlink scheduling.

14. A system for differentiating a device in a wireless network, comprising:

a base station having one or more antennas for receiving uplink messages from at least one extended reality (XR) device and transmitting data to the at least one XR device; and a processor, the processor configured to:

receive at least one uplink message from the at least one XR device, the at least one uplink message containing at least one device-level XR identifier unique to the at least one XR device, wherein the at least one device-level XR identifier is incorporated into a cell radio network temporary identifier (C-RNTI) to differentiate the at least one XR device from non-XR devices during scheduling;

determine at least one priority for the at least one XR device based on the at least one device-level XR identifier unique to the at least one XR device; and schedule transmissions by a scheduler, the scheduler scheduling data transmission to the at least one XR device based on the at least one priority.

15. The system of claim 14, wherein the at least one XR identifier is provided as a bit in the at least one uplink message.

16. The system of claim 14, wherein the at least one XR identifier is provided in a header in the uplink message.

17. The system of claim 16, wherein the XR identifier is incorporated into a connection identifier of the at least one XR device and is a cell radio network temporary identifier (C-RNTI).

18. The system of claim 14, wherein the XR identifier is provided in a physical uplink control channel.

19. A non-transitory computer storage media storing computer-useable instructions that, when used by one or more processors, cause the processors to:

transmit an uplink message from an extended reality (XR) device, the uplink message containing a device-level XR identifier unique to the XR device, wherein the device-level XR identifier is incorporated into a cell radio network temporary identifier (C-RNTI) to differentiate the XR device from non-XR devices during scheduling;

requesting a priority in the uplink message for the at least one XR device based on the device-level XR identifier; and receiving scheduled transmissions at the XR device based on the priority.

20. The non-transitory computer storage media of claim 19, wherein the XR identifier is contained in at least one of a bit or header of the uplink message.

* * * * *